July 30, 1963 W. J. HURCOMB 3,099,056
CLAMP
Filed Nov. 2, 1961
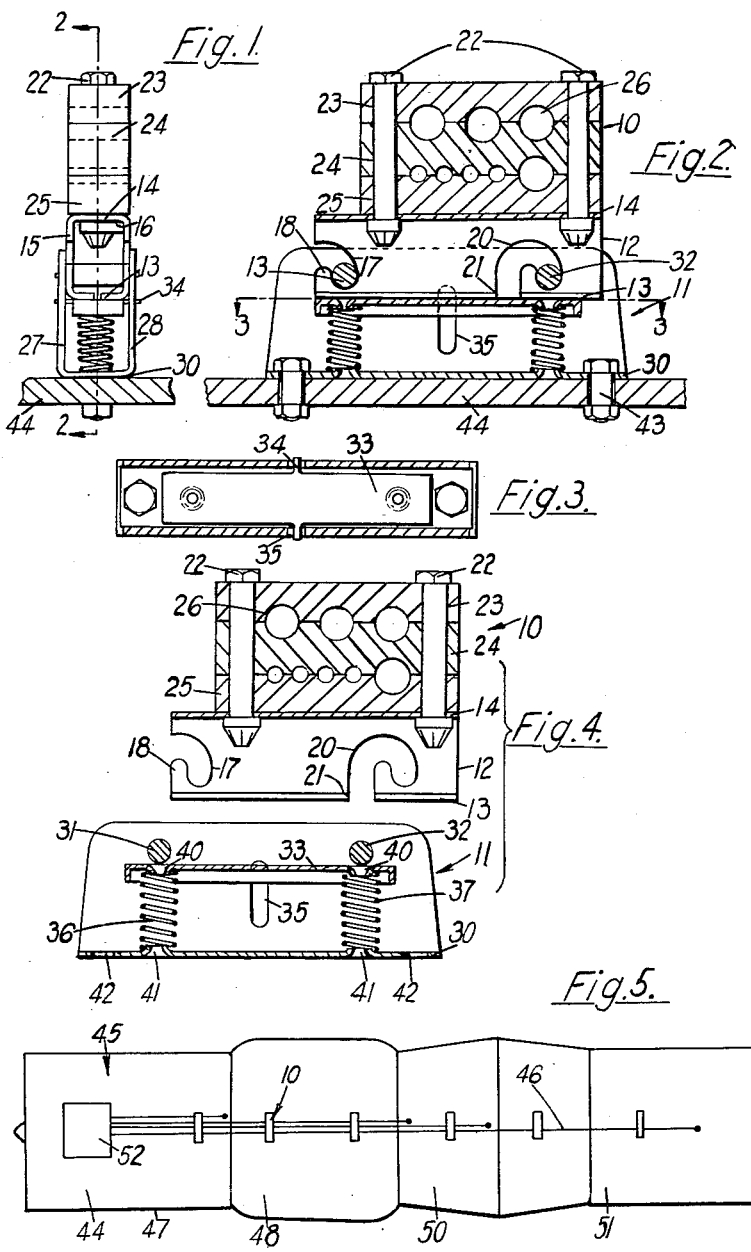
Inventor
William Jack Hurcomb
By
Cushman, Darby & Cushman
Attorneys 3,099,056
CLAMP
William Jack Hurcomb, Arnold, England, assignor to Rolls-Royce Limited, Derby, England, a company of Great Britain
Filed Nov. 2, 1961, Ser. No. 149,544
Claims priority, application Great Britain Nov. 7, 1960
6 Claims. (Cl. 24—84)

This invention concerns clamps and, although it is not restricted thereto, is more particularly concerned with clamps for clamping cables to the exterior of gas turbine engines.

According to the present invention, there is provided a clamp comprising two members the first of which is adapted to be secured to a support and the second of which carries clamp means for clamping at least one object thereto, the said first and second members having mutually engageable parts which may be readily engaged with and separated from each other.

Preferably the clamp is so constructed that engagement and separation of said parts is effected merely by manually moving said first and second members relatively to each other. That is to say, the clamp is preferably constructed so that engagement and disengagement of said parts may be effected entirely by simple manual operations such as pushing, pulling and twisting and without the use of screws, bolts and the like.

Preferably one of the members is provided with a pin and the other with a hook-shaped slot having an outer end into which the pin may be introduced and from which it may be withdrawn, there being provided means for resiliently retaining the pin in the inner end of the slot when introduced thereinto, and means for overcoming said resilient retaining means so as to permit withdrawal of the pin from the slot.

The member provided with the pin may also be provided with a spring plate which is spring urged towards said pin, the member provided with the hook-shaped slot having a slot having a surface which engages said plate during the introduction of the pin into and its withdrawal from said slot. Preferably one of the members is provided with two spaced pins and a single spring plate which is spring urged towards said pins, and the other member is provided with hook-shaped slots engageable with said pins.

Each of the members may be channel-shaped, the pins bridging the side walls of one of the members and the slots being provided in the side walls of the other member.

The clamp means is preferably adapted to clamp one or more cables or the like to the said second member. Thus the clamp means may comprise a plurality of blocks whose adjacent surfaces have aligned, semi-cylindrical recesses, and means for bolting the blocks to the said second member.

The invention also comprises a gas turbine engine having one or more cables secured thereto by means of a clamp as set forth above.

The invention is illustrated, merely by way of example, in the accompanying drawings, in which:

FIGURE 1 is an end view of a clamp according to the present invention, the clamp having two mutually engageable members which are shown in the engaged position and with one of the said members secured to a support, FIGURE 2 is a sectional elevation taken on the line 2—2 of FIGURE 1, FIGURE 3 is a sectional plan view taken on the line 3—3 of FIGURE 2, FIGURE 4 is a view similar to FIGURE 2 but showing the said mutually engageable members in the disengaged position and removed from said support, and FIGURE 5 is a schematic underneath plan view of a gas turbine engine having cables secured thereto by clamps as shown in FIGURES 1–4.

Referring to the drawings, a cable clamp comprises two mutually engageable members 10, 11 which are shown in the engaged position in FIGURES 1 and 2 and in the disengaged position in FIGURE 4.

The member 10 comprises a channel-shaped, sheet metal, part 12 which is substantially rectangular in cross section. The channel-shaped part 12 has a bottom wall 13, a top wall 14, and side walls 15, 16. A pair of aligned hook-shaped slots 17 are formed in the side walls 15, 16 and have outer ends 18 extending to ends of the side walls 15, 16. The side walls 15, 16 are also provided with a pair of aligned hook-shaped slots 20 which are spaced from the slots 17 and whose outer ends 21 extend to the bottom wall 13. The slots 20 are connected together by a slot (not shown) extending transversely of the bottom wall 13.

Secured to the top wall 14 by a pair of bolts 22 are three blocks 23, 24, 25 which may, for example, be formed of plywood. The adjacent surfaces of the blocks 23—25 are provided with a plurality of aligned semi-cylindrical recesses 26 for the reception of electric cables.

The member 11 comprises a channel-shaped, sheet metal, part which is substantially U-shaped in cross section and which has side walls 27, 28 and a bottom wall 30. The side walls 27, 28 are bridged by a pair of spaced pins 31, 32 which are respectively adapted to be introduced into and withdrawn from the slots 17, 20.

A spring plate 33 is provided with side lugs 34 which are slidable in slots 35 in the side walls 27, 28. Springs 36, 37, which are interposed between the spring plate 33 and the bottom wall 30, urge the plate 33 to a position adjacent the pins 31, 32. The spring plate 33 and bottom wall 30 are respectively provided with holes 40, 41 which are formed with rims engaging the springs 36, 37 so as to resist displacement thereof.

The bottom wall 30 is also provided with holes 42 through which extend bolts 43 by means of which the bottom wall 30 is secured to a support 44.

As shown in FIGURE 5, the support 44 may form part of the casing of a gas turbine engine 45, the latter having electric cables 46 which are secured to the underside of the engine by the clamps of FIGURES 1–4.

The gas turbine engine 45 comprises in flow series compressor means 47, combustion equipment 48, and turbine means 50, the turbine exhaust gases being exhausted to atmosphere through a jet pipe 51. The cables 46 may be connected to thermocouples (not shown) which are disposed so as to sense the compressor delivery temperature, the turbine inlet and delivery temperature, and the jet pipe temperature, the cables 46 transmitting signals representative of these temperatures to equipment 52 which is responsive to said signals. Thus the equipment 52 may control the fuel supply to the engine in dependence upon one or more of said signals or may control the supply of cooling or heating air to a point of use on the engine.

In order to secure the cables 46 in position, the members 11 are first bolted in convenient positions on the support 44, the members 10, 11 being disengaged from each other at this time. The cables 46 are then loosely threaded through the recesses 26 and the bottom wall 13 of each of the members 10 is placed against the spring plate 33 of the respective member 11 by introducing the pin 32 into the outer end 21 of the hook-shaped slot 20.

The member 10 of each clamp is then pressed inwardly towards the member 11 so as to depress the spring plate 33. When the spring 33 has been sufficiently depressed, the member 10 can be moved towards the left (as seen in the drawings) so as to cause the pins 31, 32 to pass through the slots 17, 20 to the inner ends thereof. When this has occurred, the spring plate 33 will resiliently retain the pins 31, 32 in the said inner ends. The bolts 22 are then tightened so as to secure the cables 46 firmly in position.

Release of the member 10 of each clamp from its member 11 may be readily effected merely by depressing the member 10 towards the member 11, whereby the spring plate 33 is correspondingly depressed, and then moving the member 10 towards the right (as seen in the drawings) so as to withdraw the pins 31, 32 from the slots 17, 20.

It will be appreciated that the clamp described above with reference to the drawings enables the cables 46 to be readily clamped in position and unclamped therefrom in locations in which there is very little free space.

I claim:

1. A clamp comprising a first membed adapted to be secured to a support, and having a forwardly extending planar wall, two spaced pins connected to said wall at forward locations thereof, said pins being spaced along the transverse extent of said wall and projecting at right angles therefrom, a movable plate disposed rearwardly of said pins and adjacent said wall, spring means urging said plate forwardly towards said pins in a direction at right angles to the plane containing said pins, and a second member having two hook portions, each hook portion comprising a shank extending rearwardly of the second member and connected to a forwardly extending toe, said shank and toe defining a hook-eye whose forward side is open and which is adapted to partially embrace a respective one of said pins, said hook-eyes being spaced by a distance equal to the spacing between said two pins and the toes of said hook portions being on corresponding sides of said hook-eyes, whereby said second member may be moved rearwardly towards said first member to cause both hook portions simultaneously to engage and depress said plate, and then transversely and forwardly relative to said first member to cause each of said pins to enter a respective one of said hook-eyes laterally through said forward open side thereof, said plate being movable forwardly to maintain said pins partially embraced within said hook-eye so that said two members are held relatively to one another against transverse and separating movement, said second member having clamp means for clamping at least one object thereto.

2. A clamp comprising a first member adapted to be secured to a support, and having a forwardly extending planar wall, two spaced pins connected to said wall at forward locations thereof, said pins being spaced along the transverse extent of said wall and projecting at right angles therefrom, a movable plate disposed rearwardly of said pins and adjacent said wall, spring means urging said plate forwardly towards said pins in a direction at right angles to the plane containing said pins, and a second member having two hook portions, each hook portion comprising a shank extending rearwardly of the second member and connected to a forwardly extending toe, said shank and toe defining a hook-eye whose forward side is open and which is adapted to partially embrace a respective one of said pins, said hook-eyes being spaced by a distance equal to the spacing between said two pins and the toes of said hook portions being on corresponding sides of said hook-eyes, whereby said second member may be moved rearwardly towards said first member to cause both hook portions simultaneously to engage and depress said plate, and then transversely and forwardly relative to said first member to cause each of said pins to enter a respective one of said hook-eyes laterally through said forward open side thereof, said plate being movable forwardly to maintain said pins partially embraced within said hook-eye so that said two members are held relatively to one another against transverse and separating movement, said second member having clamp means for clamping at least one object thereto, said clamp means comprising at least two blocks bolted together, said blocks having adjacent surfaces defining object-receiving recesses therebetween, said recesses extending at right angles to the transverse spacing of said hook-eyes.

3. A clamp comprising a first member adapted to be secured to a support, and having two spaced parallel forwardly extending side walls, two spaced pins interconnecting said side walls at forward locations thereof, said pins being spaced along the transverse extents of said side walls and projecting at right angles therefrom, a movable plate disposed between said side walls and rearwardly of said pins, spring means urging said plate forwardly towards said pins in a direction at right angles to the plane containing said pins, and a second member having two hook portions, each hook portion having a width equal to the spacing between said side walls, and comprising shank means extending rearwardly of said second member and connected to forwardly extending toe means, said shank means and said toe means defining a hook-eye whose forward side is open and which is adapted to partially embrace a respective one of said pins, said hook-eyes being spaced by a distance equal to the spacing between said two pins, and the toe means of said hook portions being on corresponding sides of said hook-eyes, whereby said second member may be moved rearwardly towards said first member to cause both hook portions to enter between said side walls and simultaneously engage and depress said plate, and then transversely and forwardly relative to said first member to cause each of said pins to enter a respective one of said hook-eyes laterally through said forward open side thereof, said plate being movable forwardly to maintain said pins partially embraced within said hook-eyes so that said two members are held relatively to one another against transverse and separating movement, said second member having clamp means for clamping at least one object thereto.

4. A clamp as claimed in claim 3 in which said first member includes a rear wall connecting said side walls, said plate and said rear wall being provided with opposite projections engaging said spring means.

5. A clamp comprising a first member adapted to be secured to a support, and having two spaced parallel forwardly extending side walls, two spaced pins interconnecting said side walls at forward locations thereof, said pins being spaced along the transverse extents of said side walls and projecting at right angles therefrom, a movable plate disposed between said side walls and rearwardly of said pins, spring means urging said plate forwardly towards said pins in a direction at right angles to the plane containing said pins, and a second member comprising a box-section member having a width equal to the spacing between said side walls of the first member, and clamp means connected to said box-section member for clamping at least one object to the clamp means, said box-section member having a rearward wall, two side walls and a forward wall, said side walls and said rearward wall having cut-away portions leaving two rearwardly extending hook portions in said box-section member, each hook portion comprising two oppositely spaced rearwardly extending shank portions forming parts of said side walls of the box-section member, each shank portion being connected to a respective forwardly extending toe portion, the shank portions and toe portions of each hook portion defining a hook-eye whose forward side is open and which is adapted to partially embrace a respective one of said pins, said hook-eyes being spaced by a distance equal to the spacing between said two pins, and the toe portions of said hook portions being on corresponding sides of said hook-eyes, whereby said second member may be moved rearwardly towards said first member to cause both hook portions to enter between said side walls of the first member and simultaneously engage and depress said plate, and then transversely and forwardly relative to said first member to cause each of said pins to enter a respective one of said hook-eyes laterally through said forward open side thereof, said plate being movable forwardly to maintain said pins partially embraced within said hook-eyes so that said two members are held relatively to one another against transverse and separating movement.

6. A clamp comprising a first member adapted to be secured to a support, and having two spaced parallel forwardly extending side walls, two spaced pins interconnecting said side walls at forward locations thereof, said pins being spaced along the transverse extents of said side walls and projecting at right angles therefrom, a movable plate disposed between said side walls and rearwardly of said pins, spring means urging said plate forwardly towards said pins in a direction at right angles to the plane containing said pins, and a second member comprising a box-section member having a width equal to the spacing between said side walls of the first member, and clamp means connected to said box-section member for clamping at least one object to the clamp means, said box-section member having a rearward wall, two side walls and a forward wall, said side walls and said rearward wall having cut-away portions leaving two rearwardly extending hook portions in said box-section member, each hook portion comprising two oppositely spaced rearwardly extending shank portions forming parts of said side walls of the box-section member, each shank portion being connected to a respective forwardly extending toe portion, the shank portions and toe portions of each hook portion defining a hook-eye whose forward side is open and which is adapted to partially embrace a respective one of said pins, said hook-eyes being spaced by a distance equal to the spacing between said two pins, and the toe portions of said hook portions being on corresponding sides of said hook-eyes, whereby said second member may be moved rearwardly towards said first member to cause both hook portions to enter between said side walls of the first member and simultaneously engage and depress said plate, and then transversely and forwardly relative to said first member to cause each of said pins to enter a respective one of said hook-eyes laterally through said forward open side thereof, said plate being movable forwardly to maintain said pins partially embraced within said hook-eyes so that said two members are held relatively to one another against transverse and separating movement, said clamp means comprising at least two blocks disposed forwardly of the box-section member, and bolted together and to said forward wall of the box-section member, said blocks having adjacent surfaces defining object receiving recesses therebetween, said recesses and said hook-eyes being parallel.

References Cited in the file of this patent
UNITED STATES PATENTS

| | | |
|---|---|---|
| 1,459,445 | Elderton et al. | June 19, 1923 |
| 2,288,158 | Ellingwood | June 30, 1942 |
| 2,450,091 | Kendall | Sept. 28, 1948 |
| 2,537,703 | Randa | Jan. 9, 1951 |
| 3,022,971 | Cote | Feb. 27, 1962 |

FOREIGN PATENTS

| | | |
|---|---|---|
| 185 | Great Britain | of 1865 |
| 29,605 | Great Britain | of 1906 |
| 625,430 | Germany | Feb. 8, 1936 |
| 941,598 | France | July 26, 1948 |
| 1,239,456 | France | July 18, 1960 |

OTHER REFERENCES

Jane's All the World's Aircraft, 1959–1960; rec'd in Scientific Library, March 16, 1960. (Copy in Div. 22.)